(12) United States Patent
Le Jaouen et al.

(10) Patent No.: US 9,358,869 B2
(45) Date of Patent: Jun. 7, 2016

(54) ELEMENTS FOR REINFORCEMENT AGAINST EXTERNAL STRESSES FOR A POWER SUPPLY BATTERY

(71) Applicant: RENAULT s.a.s., Boulogne-Billancourt (FR)

(72) Inventors: Guillaume Le Jaouen, Montigny le Bretonneux (FR); Yannick Kerguelen, Dourdan (FR); Thierry Ferron, Les Clayes (FR); Luan Nguyen, Palaiseau (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/394,564

(22) PCT Filed: Apr. 16, 2013

(86) PCT No.: PCT/FR2013/050837
§ 371 (c)(1),
(2) Date: Oct. 15, 2014

(87) PCT Pub. No.: WO2013/156732
PCT Pub. Date: Oct. 24, 2013

(65) Prior Publication Data
US 2015/0075890 A1    Mar. 19, 2015

(30) Foreign Application Priority Data

Apr. 17, 2012  (FR) ...................................... 12 53526

(51) Int. Cl.
*B60K 6/40*     (2007.10)
*B60K 1/04*     (2006.01)
(Continued)

(52) U.S. Cl.
CPC . *B60K 6/405* (2013.01); *B60K 1/04* (2013.01); *B60K 6/40* (2013.01); *B62D 21/15* (2013.01);
(Continued)

(58) Field of Classification Search
CPC ............ B60K 6/40; B60K 6/405; B60K 1/04; B60K 2001/0438; B60Y 2306/01; Y10S 903/952
USPC ......................... 180/68.5; 296/193.07, 187.08
See application file for complete search history.

(56) References Cited

U.S. PATENT DOCUMENTS

| | | | |
|---|---|---|---|
| 2009/0152034 A1 | 6/2009 | Takasaki et al. | |
| 2011/0011654 A1* | 1/2011 | Kubota | ..................... B60K 1/04 180/65.21 |
| 2012/0121959 A1* | 5/2012 | Yamada | ................... B60K 1/04 429/100 |

(Continued)

FOREIGN PATENT DOCUMENTS

| | | |
|---|---|---|
| DE | 10 2010 013 022 A1 | 9/2011 |
| EP | 2 070 754 A1 | 6/2009 |
| WO | WO 2011/061571 A1 | 5/2011 |

OTHER PUBLICATIONS

International Search Report issued Jun. 18, 2013, in PCT/FR13/050837 filed Apr. 16, 2013.

(Continued)

*Primary Examiner* — Keith Frisby
(74) *Attorney, Agent, or Firm* — Oblon, McClelland, Maier & Neustadt, L.L.P.

(57) ABSTRACT

An arrangement for a motor vehicle having an electric or hybrid engine includes a power supply battery and reinforcing elements to protect the battery from external stresses applied to the vehicle in a longitudinal and/or transverse direction of the vehicle, in particular in the event of an impact. The reinforcing elements are separate from the battery and separate from an enclosure of the battery in particular. The battery is attached to the reinforcing elements. First structural elements of the chassis of the vehicle are sandwiched and clamped between the battery and the reinforcing elements.

16 Claims, 3 Drawing Sheets

Figure 1:
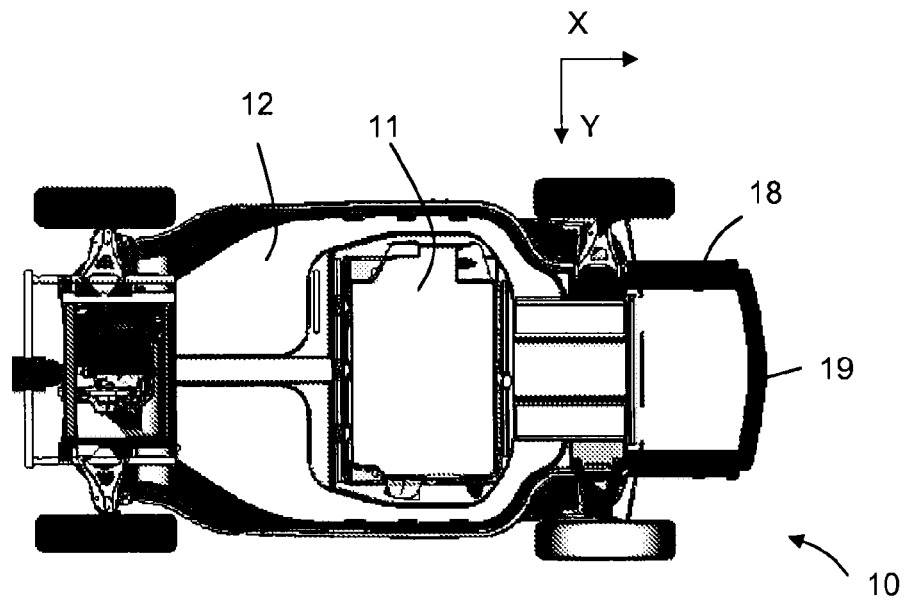

(51) Int. Cl.
*B60K 6/405* (2007.10)
*B62D 21/15* (2006.01)
*H01M 2/10* (2006.01)

(52) U.S. Cl.
CPC ........... *B62D 21/157* (2013.01); *H01M 2/1072* (2013.01); *H01M 2/1083* (2013.01); *B60K 2001/0438* (2013.01); *B60Y 2306/01* (2013.01); *H01M 2220/20* (2013.01); *Y10S 903/952* (2013.01); *Y10T 29/49826* (2015.01)

(56) References Cited

U.S. PATENT DOCUMENTS

2012/0223113 A1   9/2012   Gaisne et al.

OTHER PUBLICATIONS

French Preliminary Search Report issued Mar. 14, 2013, in French Application No. 12 53526 filed Apr. 17, 2012.

* cited by examiner

ELEMENTS FOR REINFORCEMENT AGAINST EXTERNAL STRESSES FOR A POWER SUPPLY BATTERY

TECHNICAL FIELD OF THE INVENTION

The invention relates to the field of the structure of vehicles with electric or hybrid motors.

The invention relates more specifically to an arrangement for a motor vehicle with an electric or hybrid motor that has a power supply battery and reinforcing elements independent of the battery that are designed to protect the battery against external stresses applied to the vehicle in a longitudinal direction and/or a transverse direction of the vehicle, in particular in the event of impact.

It also relates to a motor vehicle with an electric or hybrid engine that includes such an arrangement, as well as a method for mounting a power battery of a motor vehicle with an electric or hybrid motor on a chassis of the vehicle.

PRIOR ART

The architecture of hybrid- or electric-traction vehicles is often specific. The power supply battery is not necessarily installed in the place of the tank of a conventional internal-combustion-engine vehicle. The positioning of same on the central portion of the structure of the vehicle makes it vulnerable, in particular to lateral impacts by an object such as a post.

Furthermore, the central portion of the structure is sometimes formed by one or more non-load-bearing carbon-fiber (for example) unitized bodies to protect the enclosure of the battery, which is often made of a fragile material such as an aluminum part obtained for example by means of a casting process.

A known solution involves placing the power supply battery next to the rear or front axle of the vehicle (in general, in place of the fuel tank of an internal-combustion-engine vehicle). This positioning takes advantage of the transverse stiffness of the axles and helps to ensure the integrity of the battery in the event of an impact.

However, such an arrangement is not always possible, in particular in consideration of the design constraints of the propulsion system in the rear zone. As a result, the battery is often placed in the central portion of the structure, in which case the transverse dimension of same results in proximity to the lateral edges of the vehicle, which is liable to result in major deformations of the battery and to generate a risk of electrocution and/or fire.

For this reason, in relation to electric or hybrid vehicles and with a view to ensuring general safety, there is a need to provide a solution guaranteeing the integrity of the traction power supply battery in different impact scenarios (frontal impact, rear impact and post side impact) including in the case of installation in the central portion of the vehicle and/or if unitized bodies are used, to minimize the risk of contact between the internal elements of the battery during the impact and to prevent electrocution and/or short-circuiting liable to cause a fire during or after the impact.

Documents WO2011/061571, EP1950070B1 and EP2070754 describe solutions implementing reinforcing elements rigidly and permanently attached to the battery, which may be inconvenient during handling, manufacture and storage of the batteries.

PURPOSE OF THE INVENTION

The purpose of the present invention is to propose a solution that overcomes the drawbacks set out above and that addresses the general objectives set out above.

A first aspect of the invention relates to an arrangement for a motor vehicle with an electric or hybrid motor that has a power supply battery and reinforcing elements independent of the battery that are designed to protect the battery against external stresses applied to the vehicle in a longitudinal direction and/or a transverse direction of the vehicle, in particular in the event of impact. The arrangement includes first structural elements of a chassis of the vehicle and the unit is designed such that the first structural elements are sandwiched between the battery and the reinforcing elements, in particular in a vertical direction.

The arrangement may also include attachment elements for removably attaching the battery to the reinforcing elements.

The attachment elements may be designed to exert an approaching force moving the battery towards the reinforcing elements by clamping the first structural elements between the battery and the reinforcing elements under the action of said approaching force.

The first structural chassis elements can be at least one unitized body, in particular made of a carbon-fiber-based composite material, arranged at least in one central portion of an underframe of the vehicle in the longitudinal direction.

The arrangement may include second structural elements of the chassis of the vehicle that are distinct from the first structural elements, the reinforcing elements being rigidly connected to the second structural elements, in particular by screws.

The second structural chassis elements may include a frame arranged at least in one front portion of the underframe of the vehicle in the longitudinal direction of the vehicle, reinforcing elements extending therefrom next to the central portion of the underframe.

The reinforcing elements may be positioned from above onto the first structural elements.

The reinforcing elements may be attached to the first structural elements, in particular by gluing, such that the reinforcing elements stiffen the first structural elements, in particular in the presence of flexural and/or torsional loads applied to the chassis.

The reinforcing elements may include longitudinal sections and transverse sections, in particular made of a metallic material such as steel, extruded aluminum or an aluminum alloy, that are assembled together, in particular by mechanical welding, to form a frame surrounding the battery in a given plane, in particular in a horizontal plane.

A second aspect of the invention relates to a motor vehicle with an electric or hybrid motor that includes such an arrangement.

A third aspect of the invention relates to a method for mounting a power supply battery of a motor vehicle with an electric or hybrid motor on a chassis of the vehicle, including the following steps:
  providing the battery and the reinforcing elements independent of the battery, which are in particular independent of an enclosure of the battery and which are designed to protect the battery, on completion of the following step, against external stresses applied to the vehicle in a longitudinal direction and/or a transverse direction of the vehicle, in particular in the event of impact,
  attaching the battery to the reinforcing elements by sandwiching and clamping the first structural chassis elements of the vehicle between the battery and the reinforcing elements.

SHORT DESCRIPTION OF THE DRAWINGS

Figure 2:
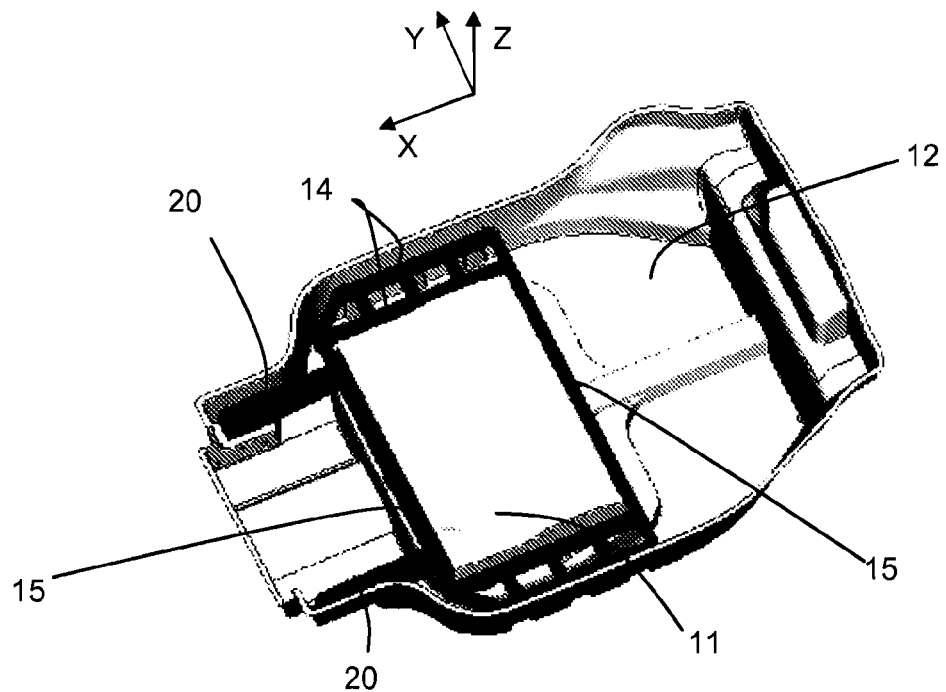
Figure 3:
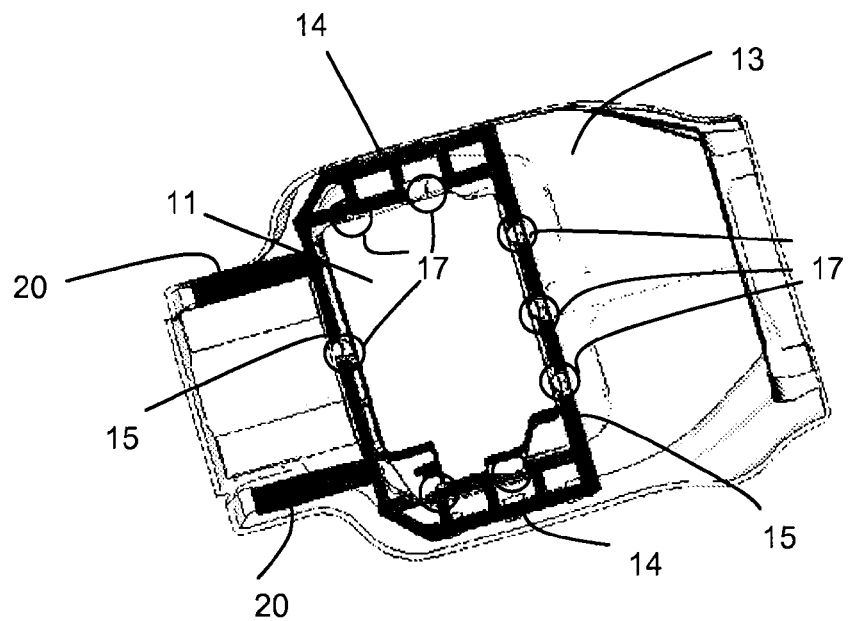
Figure 4:
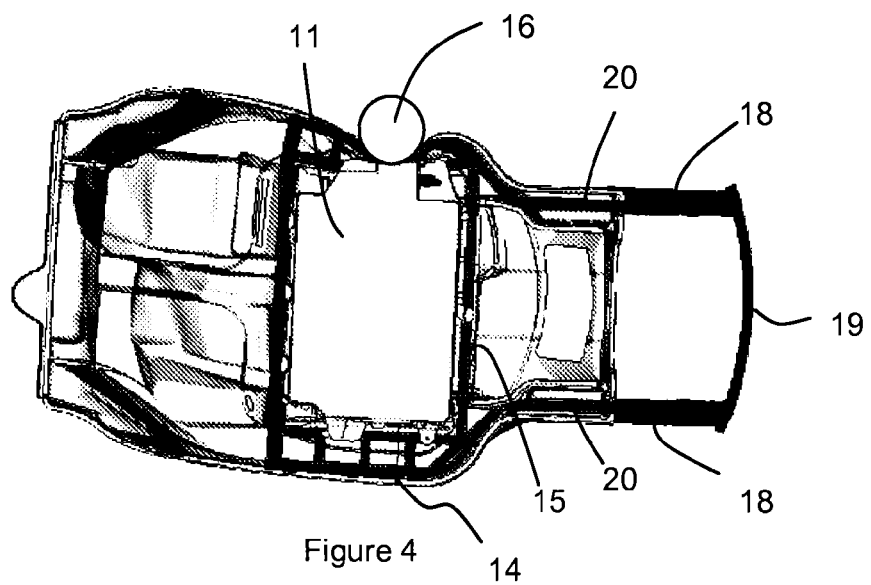
Figure 5:
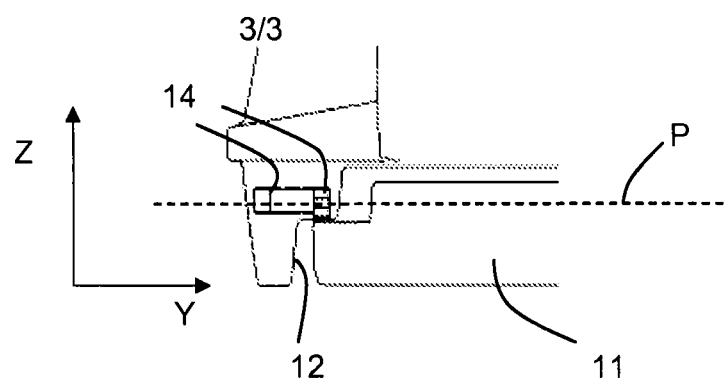
Figure 6:
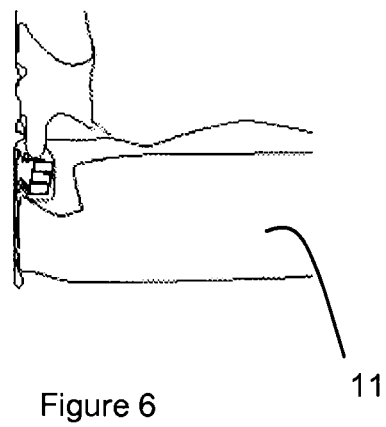

Other advantages and features are set out more clearly in the description given below of specific embodiments of the invention, which are provided as nonlimiting examples and are shown on the attached drawings, in which:

FIG. 1 is a bottom view of a motor vehicle fitted with an example arrangement according to the invention, FIG. 2 is a top view of the reinforcing elements used, FIG. 3 is a top view of the reinforcing elements and the battery used, FIG. 4 is a bottom view of the arrangement, following an external lateral post impact, FIGS. 5 and 6 are local cross sections of the arrangement, at the edge of the battery, respectively before and after the impact represented in FIG. 4.

DESCRIPTION OF PREFERRED EMBODIMENTS OF THE INVENTION

The remainder of the description relates, with reference to FIGS. 1 to 6, to a motor vehicle 10 with an electric or hybrid motor that includes an arrangement according to the invention detailed below. To provide the electric drive motor with electrical energy, the vehicle 10 carries a power supply battery 11. The unit is designed such that the battery 11 is attached removably via the underside of the vehicle 10, for example in the central portion of the vehicle 10, i.e. substantially halfway along the length of the vehicle 10.

The motor vehicle 10 has a structural chassis made up of several portions. The chassis thus comprises a first portion formed by the first structural chassis elements comprising at least one unitized body 12, in particular made of a carbon-fiber-based composite material, arranged at least in one central portion of the underframe of the vehicle 10 in the longitudinal direction X of the chassis. The transverse direction Y of the vehicle corresponds to the width of the vehicle 10 and the vertical direction is marked Z on the figures. If the first chassis portion has a plurality of unitized bodies, these are assembled together, in particular by gluing, such as to form a one-piece unit that is as rigid as possible on account of for example the formation of hollow tubular bodies delimited by the unitized bodies together. The first structural elements may in particular include at least one supplementary unitized body 13 in addition to the unitized body 12. One possible arrangement involves superposing the unitized bodies 12 and 13, the unitized body 13 being above the unitized body 12. It should also be specified that, in FIGS. 3 and 4, only the battery 11 is shown, while the unitized body 12 is not shown on these bottom views of the arrangement.

Each of the unitized bodies 12, 13 is in particular monolithic. The term "monolithic" refers to the fact that the unitized body has a single dense wall and is not a two-wall sandwich structure clamping a less dense honeycomb material.

Naturally, the first structural elements making up the first chassis portion may however be different, for example they may take the form of a frame made up of reinforcing sections.

The unitized body 12 has, approximately halfway along the length of same in the direction X and throughout substantially all of the width of same in the direction Y, a reinforcing element oriented vertically upwards, the overall shape of which matches the shape of the enclosure of the battery 11, which is also referred to as the casing. The back of the reinforcing element may have an opening (not shown) with longitudinal and transverse dimensions that are less than the longitudinal and transverse dimensions of the enclosure of the battery 11. The reinforcing element is designed to receive the battery 11 from below along Z, from the side of the lower face of the unitized body 12.

The arrangement in the vehicle 10 includes, in addition to the battery 11, reinforcing elements designed to protect the battery 11 against external stresses applied to the vehicle 10 in the longitudinal direction X (frontal impact or rear impact) and/or the transverse direction Y (side impact by an external object such as a post) in particular in the event of impact.

According to an essential feature, the reinforcing elements, which are detailed below, are independent of the battery 11, and in particular are independent of the enclosure of same.

The reinforcing elements advantageously include longitudinal structural sections 14 oriented in the direction X and transverse structural sections 15 arranged in the direction Y. Preferably, the sections 14, 15 are made of a metallic material such as steel, extruded aluminum (such as Al6005 or Al6260) or an aluminum alloy. The use of sections or extruded aluminum sections makes it possible firstly to incorporate ribs, thereby ensuring good rigidity under flexing, and secondly to contain the mass of the unit. Simulations have shown that a thickness of the sections 14, 15 of between 2 and 3.5 mm gives satisfactory results in terms of rigidity.

The sections 14, 15 are assembled together in twos, in particular by mechanical welding to provide the desired impact resistance, in order to form a frame, for example a rectangular frame, surrounding the battery 11 in a given plane P (FIG. 5) in particular in a horizontal plane (X, Y). The unit is designed to create at least one continuous transverse reinforcement of the underframe of the chassis, guaranteeing optimum integrity of the battery 11 in the event of impact. The protective frame thus formed by the sections 14, 15 about the battery must remain as integral as possible in order to limit the stresses applied to the enclosure of the battery 11. The longitudinal sections oriented in the direction X are intended to absorb all or part of the energy, by deformation or rupture, in the event of a lateral impact in the direction Y. In the variant illustrated, on each longitudinal edge of the battery 11, the reinforcing elements therefore include two parallel and directly adjacent longitudinal sections 14 connected along the length of same by a plurality of joining sections oriented in the direction Y, improving energy absorption in the event of a lateral impact applied externally to the vehicle 10 at least in the direction Y, by an object such as a post 16 (FIG. 4).

The reinforcing elements, which may however be of a different kind depending on the required function, are positioned from above along Z on the first structural elements, in particular on the unitized body 12 next to the upper face thereof. This ensures firstly that the reinforcing elements are arranged between the unitized bodies 12 and 13 in the vertical direction Z, and secondly that the unit is designed such that the first structural elements, next to the unitized body 12, are sandwiched between the battery 11 and the reinforcing elements in the vertical direction Z. It is possible for the first structural elements to be sandwiched between the reinforcing elements and the battery 11 in a direction other than the vertical direction Z, in particular with a component running along the longitudinal direction X and/or along the transverse direction Y.

Advantageously, as illustrated in FIGS. 2 and 5, the reinforcing elements are attached to the unitized body 12 of the first structural elements, in particular by gluing, such that the reinforcing elements stiffen all of the first structural elements, in particular in the presence of flexural and/or torsional loads applied to the chassis. However, other attachment means could be used, such as screwing or welding, depending on the nature of the reinforcing elements and the first structural elements.

The arrangement includes attachment elements 17 for removably attaching the battery 11 to the reinforcing elements. Notably, the attachment elements 17 are designed to exert an approaching force moving the battery 11 towards the reinforcing elements by clamping the first structural elements (in this case the unitized body 12) between the battery 11 and the reinforcing elements under the action of said approaching force. There may be any number of such attachment elements 17 and they may be of any type. In the variant illustrated, on each of the longitudinal edges oriented in the direction X, the battery 11 is attached to the reinforcing elements by two attachment elements 17 each having a screw directly engaged in one of the two adjacent longitudinal sections 14. On the rear transverse edge of same, the battery 11 is attached to a transverse section 15 by three attachment elements 17 each using a plate attached to the section 15 and in which a fastening screw is engaged. On the front transverse edge of same, the battery 11 is attached to a transverse section 15 by a single attachment element 17. The unitized body 12 is provided with openings for these screws to pass through.

Furthermore, the chassis of the vehicle 10 includes at least a second portion formed by second structural elements of the chassis of the vehicle 10 that are distinct from the first structural elements detailed above. The second structural chassis elements include a frame arranged at least in one front portion of the underframe of the vehicle 10 in the longitudinal direction X of the vehicle 10, reinforcing elements extending therefrom next to the central portion of the underframe. In the variant illustrated, the frame includes at least two front spars 18 oriented in the direction X and joined together at the extremities of same by a front cross member 19 (FIG. 4). The reinforcing elements include at least one linking section 20, in this case two, extending forwards in the direction X from the front transverse section 15. In general, the reinforcing elements are rigidly and removably connected to the second structural elements, in particular by screws. In one possible arrangement, each linking section 20 cooperates by means of a male-female assembly with the rear extremity of a front spar 18, subsequent screwing holding the assembly together. As such, the reinforcing elements receive all or part, in this case only the lower part, of the front portion of the chassis (frame) of the vehicle 10, to absorb frontal impacts. In other words, it is the reinforcing elements 14, 15, 20 that provide the mechanical link between the first and second portions of the chassis of the vehicle 10.

Mounting the battery 11 on the chassis of the vehicle 10 therefore includes the following steps:
providing the battery 11 and the reinforcing elements 14, 15 that are independent of the battery, which are in particular independent of the enclosure of the battery and which are designed to protect the battery 11, on completion of the following step, against external stresses applied to the vehicle in the longitudinal direction X and/or the transverse direction Y of the vehicle 10, in particular in the event of impact,
attaching the battery 11 to the reinforcing elements 14, 15 by sandwiching and clamping the first structural chassis elements (unitized body 12) of the vehicle between the battery 11 and the reinforcing elements 14, 15.

Following such an assembly, FIGS. 4 and 6 show the situation of the arrangement following an external lateral impact applied to the vehicle 10 at least in the transverse direction Y by the post 16. These figures show that the longitudinal elements of the reinforcing elements, in this case the longitudinal sections 14, have absorbed almost all of the energy resulting from this lateral impact. The deformation or rupture of the longitudinal sections 14 and/or of the joining sections ensure optimum integrity of the battery 11. All of the reinforcing elements must in particular be designed in consideration of the fact that a crack in the enclosure of the battery 11 is permitted, but it must not enable a "standard" finger to pass through.

The invention claimed is:
1. An arrangement for a motor vehicle including at least one of an electric motor and a hybrid motor, the arrangement comprising:
a power supply battery;
reinforcing elements comprising longitudinal structural sections and transverse structural sections assembled together to form an integral frame which surrounds the power supply battery in a plane of the battery such that the reinforcing elements are independent of the battery and protect the battery against external stresses applied to the vehicle in at least one of a longitudinal direction and a transverse direction of the vehicle; and
first structural elements of a chassis of the vehicle, wherein the first structural elements are sandwiched between the battery and the reinforcing elements.
2. The arrangement as claimed in claim 1, wherein the first structural elements are sandwiched between the battery and the reinforcing elements in a vertical direction.
3. The arrangement as claimed in claim 1, further comprising:
attachment elements that removably attach the battery to the reinforcing elements.
4. The arrangement as claimed in claim 3, wherein the attachment elements exert an approaching force to move the battery towards the reinforcing elements by clamping the first structural elements between the battery and the reinforcing elements under the action of said approaching force.
5. The arrangement as claimed in claim 1, wherein the first structural chassis elements are at least one unitized body, arranged at least in one central portion of an underframe of the vehicle in the longitudinal direction.
6. The arrangement as claimed in claim 5, wherein the at least one unitized body includes a carbon-fiber-based composite material.
7. The arrangement as claimed in claim 1, further comprising:
second structural elements of the chassis of the vehicle are distinct from the first structural elements, wherein the reinforcing elements are rigidly connected to the second structural elements.
8. The arrangement as claimed in claim 7, wherein the reinforcing elements are rigidly connected to the second structural elements by screws.
9. The arrangement as claimed in claim 7, wherein the second structural elements include:
a frame arranged at least in one front portion of an underframe of the vehicle in the longitudinal direction of the vehicle, and
reinforcing elements extending from the frame next to the central portion of the underframe.
10. The arrangement as claimed in claim 1, wherein the reinforcing elements are positioned from above onto the first structural elements.
11. The arrangement as claimed in claim 1, wherein the reinforcing elements are attached to the first structural elements, such that the reinforcing elements stiffen the first structural elements when at least one of flexural loads and torsional loads are applied to the chassis.
12. The arrangement as claimed in claim 11, wherein the reinforcing elements are attached to the first structural elements by glue.

13. The arrangement as claimed in claim 1, wherein the longitudinal sections and transverse sections are made of at least one of steel, extruded aluminum, and an aluminum alloy.

14. The arrangement as claimed in claim 1, wherein the longitudinal sections and transverse sections are assembled together by mechanical welds.

15. The arrangement as claimed in claim 1, wherein the plane is a horizontal plane.

16. A motor vehicle comprising:
   the arrangement for a motor vehicle including at least one of an electric motor and a hybrid motor, as claimed in claim 1.

* * * * *